United States Patent

Jacobson

[15] 3,658,185

[45] Apr. 25, 1972

[54] STORAGE AND RETRIEVAL DEVICE

[72] Inventor: James J. Jacobson, New York, N.Y.

[73] Assignee: Wahl Associates Inc., Long Island City, N.Y.

[22] Filed: Aug. 6, 1970

[21] Appl. No.: 61,689

[52] U.S. Cl. .................................................211/40, 312/13

[51] Int. Cl. .......................................................A47g 29/00

[58] Field of Search .............................211/40, 23; 312/13, 9

[56] References Cited

UNITED STATES PATENTS

| | | | |
|---|---|---|---|
| 1,361,824 | 12/1920 | Bugbee | 206/72 |
| 1,914,564 | 6/1933 | Grandjean | 211/40 X |
| 2,281,845 | 5/1942 | Kaplan | 211/40 |
| 3,338,421 | 8/1967 | Lyman | 312/10 X |
| 3,391,792 | 7/1968 | Makar | 211/40 |

FOREIGN PATENTS OR APPLICATIONS

| | | | |
|---|---|---|---|
| 65,611 | 8/1947 | Denmark | 211/40 |
| 1,198,375 | 6/1959 | France | 211/40 |

*Primary Examiner*—Nile C. Byers, Jr.
*Attorney*—Henry R. Lerner

[57] ABSTRACT

A storage and retrieval device for disks and the like. The disks are normally stored in a rear position, and when a particular disk is to be retrieved, it is pushed to a forward position by an actuating member. The storage device is modular in nature being capable of being stacked on other storage devices to form shelves for a library of disks.

1 Claims, 4 Drawing Figures

INVENTOR
JAMES J. JACOBSON

Patented April 25, 1972 3,658,185

4 Sheets-Sheet 2

INVENTOR
JAMES J. JACOBSON

INVENTOR
JAMES J. JACOBSON

INVENTOR
JAMES J. JACOBSON

STORAGE AND RETRIEVAL DEVICE

BACKGROUND OF THE INVENTION

This invention relates to a disk storage device and, more particularly, to a disk storage and retrieval device.

Increasingly, magnetic disks are finding wide usage. For example, computer programs are frequently stored in such disks, and these disks form large libraries. Other uses for both magnetic and non-magnetic disks are plentifold, such as document storage.

Unfortunately, present disk storage systems do not enable easy identification and removal of a desired disk. These storage devices hold each disk in a separate upstanding compartment which makes the identification of each difficult. In addition, it is difficult if not almost impossible to manually remove the disks from storage because of the lack of room for fingers to be inserted in the storage compartments. Some compartments are made oversized to permit easy retrieval of the disk, but such storage devices are unnecessarily large and expensive. It can be seen that a significant flaw in most disk storage systems resides in the lack of separation between the functions of identification and retrieval.

Many present storage devices are not modular in nature necessitating the purchase of too large or too small a storage unit by the user. Lack of such modularity makes it difficult to tailor the capacity of the storage system to the user's needs.

An object of the present invention is to provide an improved disk storage and retrieval system.

Another object of the present invention is to provide a disk storage system which separates the functions of identification and retrieval.

Still another object of the present invention is to provide a disk storage system which is modular in construction.

Another object of the present invention is to provide a disk storage system which is attractive yet inexpensive.

Still another object of the present invention is to provide a relatively compact disk storage system.

Other objects, advantages and features of the present invention will become more apparent from the following description.

SUMMARY OF THE INVENTION

In accordance with the principles of the present invention the above objects are accomplished by providing a disk storage device comprising a plurality of upstanding compartments, the compartments being adjacent to neighboring compartments, first, second and third tranverse rods, the rods being attached to and across the width of the storage device, the rods forming a rest in each compartment for a respective disk, the rest being formed rearwardly in the storage device and one of the rods serving as a first stop to the forward movement of the respective disk, a plurality of fingers each of the plurality of finger members being connected in a respective compartment, each of the finger members resting against the respective disk stored in the respective compartment when the disk is in the rearward rest, a plurality of actuating levers, each of the plurality of actuating levers being associated with a respective finger member and projecting frontwardly beyond the front of the compartments, a fourth transverse rib member, the fourth transverse rib member being connected across the fronts of the plurality of compartments and forming a forward stop for each compartment, wherein when a respective lever is depressed, the associated finger pushes the respective disk over the first stop, the disk moving forwardly and being stopped by the forward stop whereby the disk partially protrudes forwardly beyond the front of the storage device.

Each of the levers may have a tab which is identified by a coded symbol or the like, and when a disk is desired, the number on the tab corresponding to the storage compartment is sought. When found, the tab is depressed causing the sought disk to move to its forward position projecting beyond the front of the compartment. The disk then is removed from the compartment. It is clear that the identification or selection process is thus removed from the retrieval function.

Preferably, the storage device is made of steel wire rods which form the plurality of compartments and stops for the device. These rods may be fabricated of other durable and sturdy materials and may be suitably decorated. Each compartment is formed by spaced apart rod members being suitably shaped and extending about half-way in an upward direction.

The storage device may be modular in nature with interconnecting members being attached to the ends of the device to engage mating members above and below the storage device to form shelves of compartments. Due to the separation of functions, the storage device may be compact in nature allowing a large member to be attached together for storing a plurality of disks.

IN THE DRAWINGS

DETAILED DESCRIPTION

The storage device of the present invention is suitable to be stacked with other similar storage devices to form a tailor made series of shelves holding disks or the like.

Figure 1:
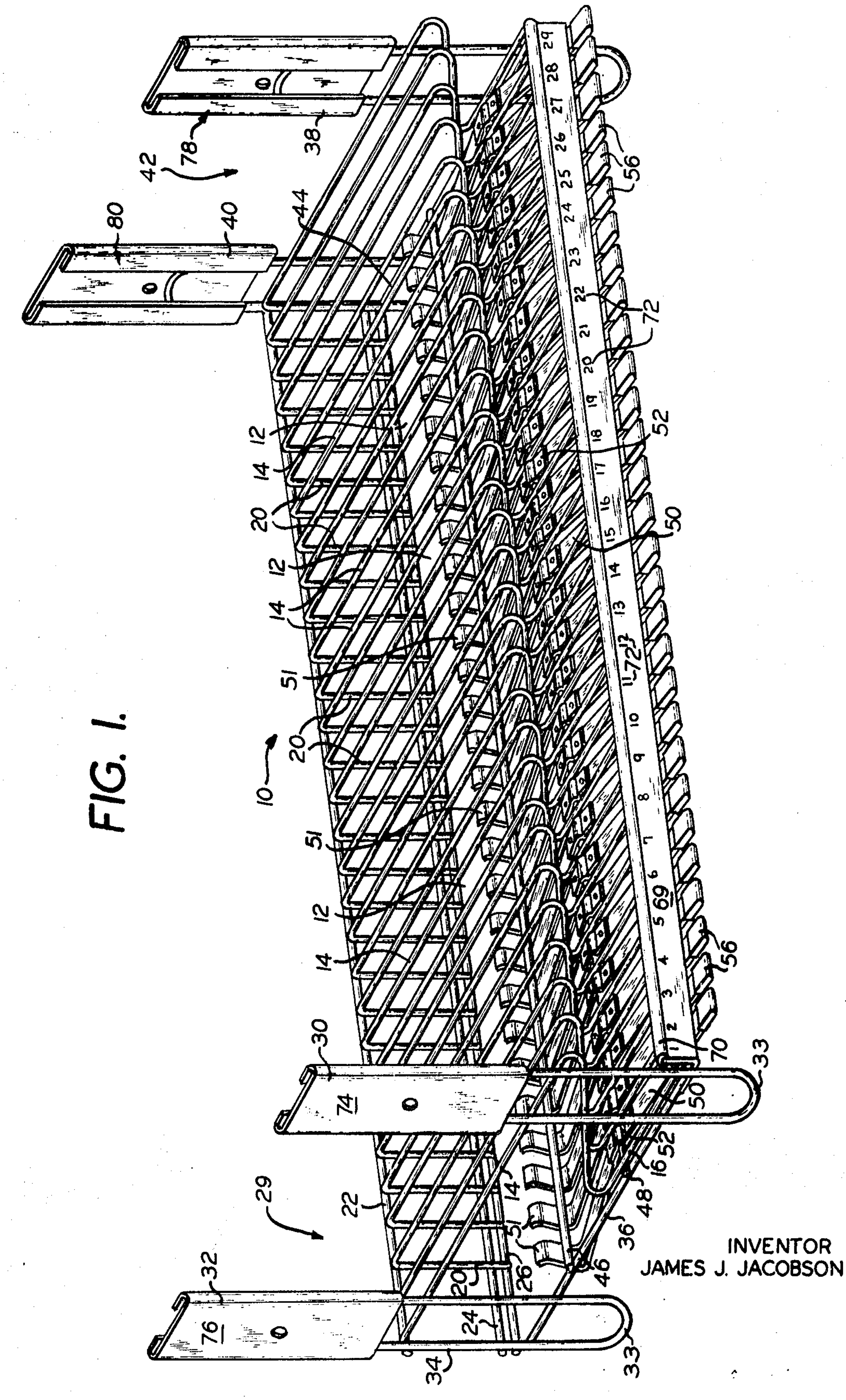
FIG. 1 is a perspective view of a single storage device of the present invention.

Referring particularly to FIG. 1, a single storage device 10 is illustrated therein including a plurality of spaced apart upstanding compartments 12 formed by spaced apart dividers or wire rods 14 forming the frame of the device. The device 10 is formed by brazing or welding differently shaped wire rod members together. Other materials may be used to construct a storage device embodying the principles of the present invention, but for purposes of illustration the wire rod assembly is utilized.

The storage device includes a plurality of forwardly extending longitudinally spaced wire rods or dividers 14. Wire rods 14 are Z-shaped having a short bottom leg 16 and a longer upper leg 18 extending from the front to the back of the storage device terminating in a downward bend 20 so that upper leg 18 and bend 20 form an L-shape. A compartment is formed between adjacent wire rods, the size and width of which is sufficient to house a suitable disk. The vertices at the rear bends of the L-form of the continuous wire rods 14 are secured, as by spot welding or brazing at their rear extremities to a first transversely extending wire rod 22. The rod 22 is secured to and across the rear of each compartment. Rod 22 forms one of the points of a three point rear rest position of disks stored in the device. For additional structural support, a pair of parallel transversely extending wire rods 24 and 26 are secured to the rear extremities of the legs 28 of the L-shaped portion of the continuous wire rods 14.

Each storage device can rest on the floor or any other flat surface or can be made to stack with other storage devices. In particular, at one end 29 of the storage device, front and rear side supports 30 and 32 respectively, are formed of U-shaped wire rods with the legs portions thereof projecting upwardly with the curved portion 33 forming the bottom of the supports. Rear leg 34 of rear support 32 is secured to rear transverse wire rods 22,26 and 24 by brazing or spot welding. A wire rod 36 extending from the rear to the front of the storage device is secured to the lower portion of the U-shaped rear support leg 32 by brazing or spot welding. The forward side support or leg 30 is then secured to wire rod 36 to form a rigid strong side support for the frame of the storage device. Similarly, front and rear side supports 38 and 40 are secured to the opposite edge or end 42 of the device and to forwardly extending wire rod 44.

The rear rest position for a disk in each compartment is formed by a three point support. The rear support is formed by the first wire rod 22. A second transverse rod 46 extending from end to end is secured to the forwardly extending rods 36 and 44 in the bottom and across each of the compartments. The second transverse rod 46 forms the second point of the three point rear rest. A third transverse rod 48 extending from end to end is placed forward of the second rod 46 and is also secured to rods 36 and 44 across each of the compartments.

Figure 3:
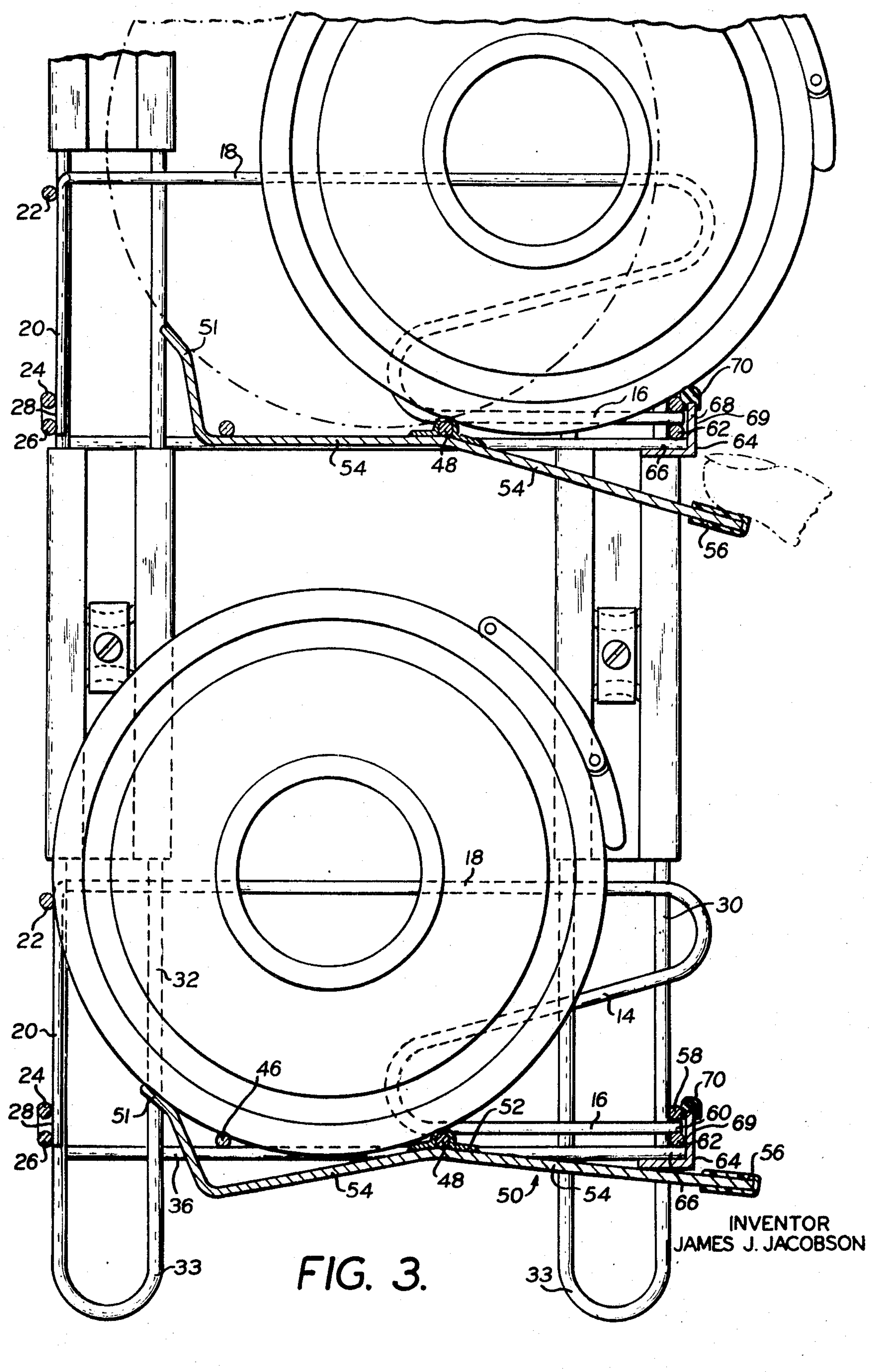
FIG. 3 is a sectional view taken along lines 3 — 3 of FIG. 2 illustrating one compartment above the other with a disk in each in different positions.

Referring more particularly to FIG. 3, the third transverse rod 48 serves as a pivot point for a plurality of actuating members 50, the function of which will be described below. Each of the actuating members is associated with a respective compartment and is formed of a lever member terminating in an upwardly extending finger member 51. A hinge or pivot plate 52 is secured around and is pivotable about transverse rod 48 and to the lever portion 54 of the respective actuating member. The hinge plate forms the third point of the three point rest for the rear position of the disk held in the storage compartment.

As seen in FIG. 3, when the disk is in its rear rest position the projecting finger member 51 rests against the rear of the disk. Forward motion of the disk is prevented by the first stop means formed by the hinge plate 52. Each actuating member is provided with a forwardly extending tab means or portion 56 which projects beyond the front of the respective compartment. When a particular disk is to be selected, the tab is depressed from its initial position to a pushing position causing the respective finger member to push against the rear of the disk enabling it to overcome the stop and move to its forward rest position.

To form a forward rest position for the compartments, an additional transversely extending wire rod 58 is secured to the top of the forward end 60 of the short leg 16 of the Z-shaped wire. Another transverse wire rod 62 is secured directly below rod 58 underneath the forward end 60 as a structural support member. A transverse L-shaped plate 64 is secured to the bottom of the front portion 66 of the forwardly extending rods 36 and 44. One leg 68 of the L-shaped plate is provided with a front display surface 69, while the front support for the front rest position is formed by securing a transverse plastic rod or support member or the like 70 to the top of leg 68. When the disk is pushed to its forward position, its forward motion is stopped by forward stop or rod 70 and the disk is made to rest between rod 70 and hinge plate 52. When in this forward position, the disk projects beyond the front of the storage device facilitating its removal from the respective compartments. The tab 56 will remain in its depressed position or pushing until the disk is placed back in storage pressing against the finger member 51 causing the lever and tab portion to return to its initial position.

For purposes of identification, a symbol 72 is placed on the display surface corresponding to a specific compartment location. When a specified disk is desired, the tab corresponging to the compartment identifying symbol is depressed pushing the disk to its forwarding projecting portion.

A plurality of storage devices may be stacked side-by-side and on top of each other. To that end, connecting plates or engaging means 74, 76, 78 and 80 are secured to the tops of the legs of the U-shaped support members 30, 32, 38, and 40, respectively. These connecting plates are adapted to slideably engage the mating U-shaped bottom of the support member. In this manner, by interconnecting such connecting plates and side supports, the storage devices may be placed on top of each other, as particularly seen in FIG. 2 with corresponding identification symbols provided for selecting the desired disk.

The compartments formed by the Z-shaped wire rods extend upwardly only a portion of the height of each compartment. The height of each compartment so formed is sufficient to prevent interference between the various compartments, while simultaneously effecting a cost savings by reducing material.

Figure 2:
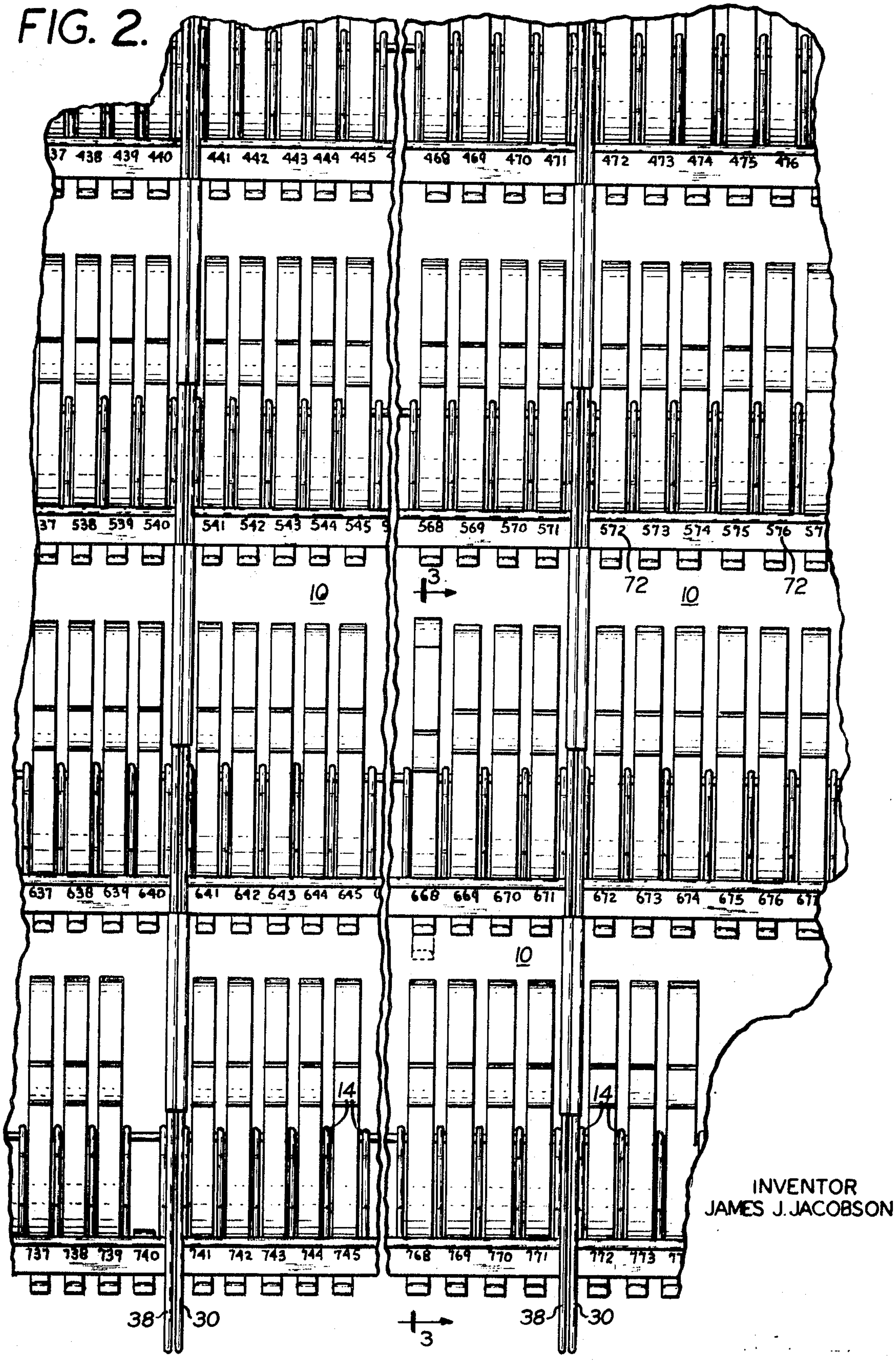
FIG. 2 is a front elevated view of a plurality of storage devices of the present invention stacked together.

When the storage devices are assembled as shown in FIG. 2, it may be appreciated that the resulting device is compact. The only clearance required is that for the lever located above a particular disk when it is in the forward rest position. Because each disk projects beyond the front of the storage device, no side clearance need be built into the storage device, nor is there much vertical clearance required between the storage devices. Because of this arrangement, it is possible to provide stacks of seven storage devices which are within normal reach, as compared to the maximum of six levels available in conventional storage devices.

Figure 4:
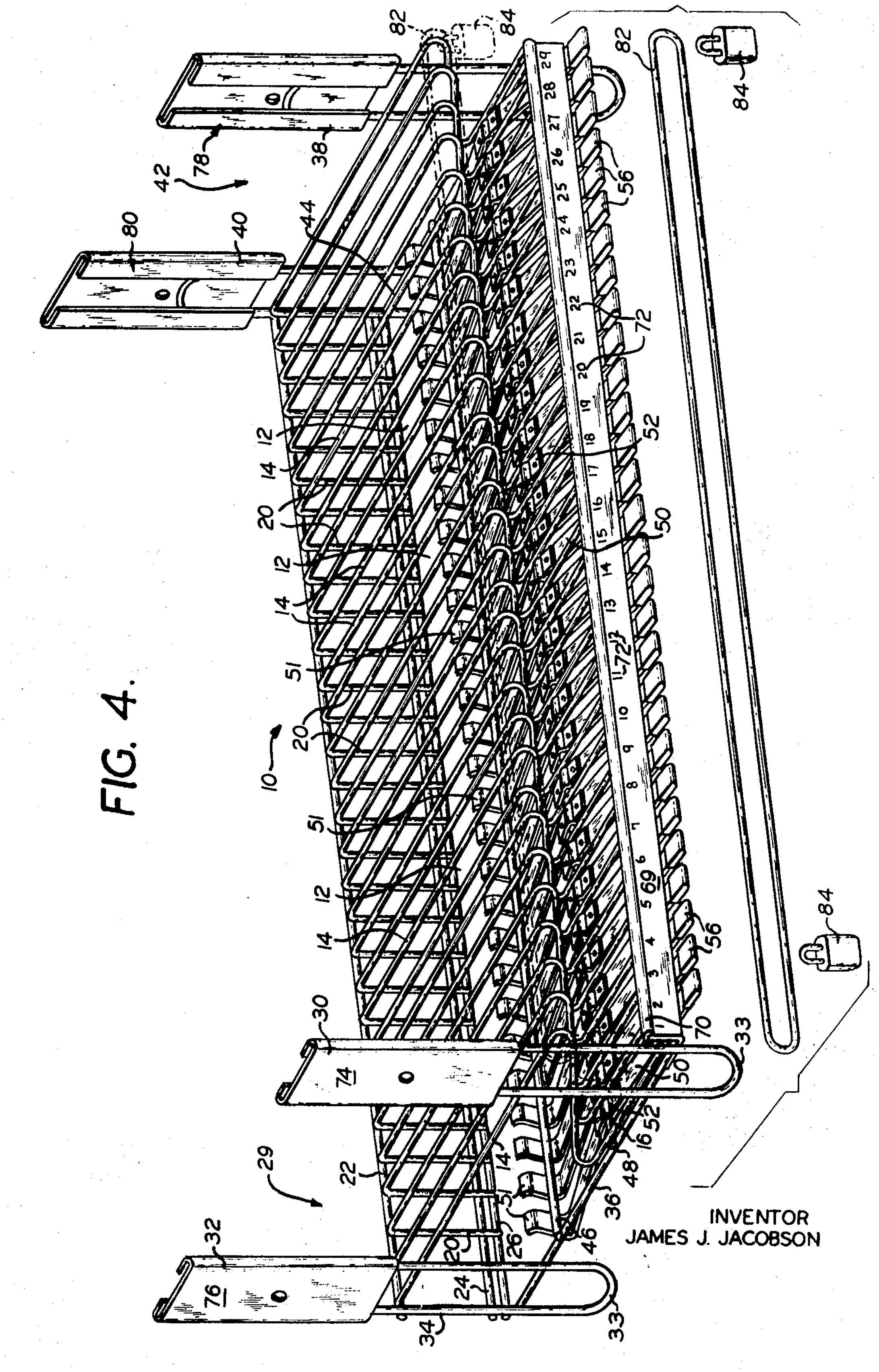
FIG. 4 is a view similar to FIG. 1, showing locking means for the storage device.

FIG. 4 shows a storage device identical to the one shown in FIG. 1 provided with convenient locking means for securing an entire device. Such locking means consists of a closed loop 82 (shown in phantom on the storage device) which encloses the forwardly extending portions of Z-shaped divider rods 14, and a pair of conventional padlocks 84 engaging the opposite end dividers. In this way, all the disks within the compartments of the storage device are secured in place, in extremely simple manner.

While I have herein shown and described the preferred embodiments of my invention, it will be understood that the invention may be embodied otherwise than as herein specifically illustrated or described, and that in the illustrated embodiments certain changes in the details of construction and in the form and arrangement of parts may be made without departing from the underlying idea or principles of this invention within the scope of the appended claims.

I claim:

1. A storage device for disks and the like comprising a plurality of upstanding compartments, each of said compartments being provided with a rear rest position and a forward rest position for a respective disk, each of said compartments being associated with a respective actuating member, first stop means, said first stop means being secured to said device in respective compartments, said first stop means preventing a respective disk from forward movement when said disk is in said rear rest position, each of said actuating members having a finger member pressing against a respective disk when said disk is in said rear rest position, and a tab means, each of said actuating members being pivotable from an initial position to a pushing position responsive to the position of said tab means so that a respective disk is pushed over said first stop when a respective tab member is depressed and said respective disk is moved to said forward rest position, said disk projecting beyond said storage device when in said forward rest position, each of said actuating members being pivotable about said first stop, and engaging means being secured to said device and engaging a mating engaging means secured to a second storage device to permit said first storage device to be placed on top of said second storage device, said compartments being formed between spaced apart rod members, a first transversely extending rod member, said first transversely extending rod member being secured to and across said spaced apart rod members at the rear of said compartments, a second transversely extending rod member, said second transversely extending rod member being secured to and across said spaced apart rod members at the bottom of said compartments, a third transversely extending rod, said third transversely extending rod member being secured to and across said spaced apart rod members at the bottom of said compartments forwardly of said second transversely extending rod, said first, second, and third transversely extending rod members forming a three point support for said rear rest position and an additional transversely extending support member, said additional transversely extending support member being secured across said spaced apart rod members at a front portion of said spaced apart rod members, said forward rest position being formed by said third transverse rod member and said additional support member, said engaging means being formed of a U-shaped rod member, said U-shaped rod member being provided with upstanding leg members and a curved section and being secured to an end of said storage device, a connecting plate, said connecting plate being secured to said leg members of said U-shaped rod member and being capable of slidably engaging the curved section of a second U-shaped rod member, said second U-shaped rod member being secured to an end of said second storage device.

* * * * *